United States Patent [19]

Ou et al.

[11] Patent Number: 5,330,843
[45] Date of Patent: Jul. 19, 1994

[54] WATER RESISTANT VERMICULITE ARTICLES AND METHOD OF THEIR MANUFACTURE

[75] Inventors: Chia-Chih Ou, Lexington, Mass.; Deborah Neumayer, Evanston, Ill.

[73] Assignee: W. R. Grace & Co.-Conn., New York, N.Y.

[21] Appl. No.: 530,715

[22] Filed: May 30, 1990

[51] Int. Cl.$^5$ ............................................. C04B 20/02
[52] U.S. Cl. ............................... 428/446; 252/378 R; 428/409; 427/421; 427/430.1; 427/443.2
[58] Field of Search ............ 252/378 R; 106/DIG. 1; 501/148, 149; 427/430.1, 421, 443.2; 428/446, 409, 331, 428

[56] References Cited

U.S. PATENT DOCUMENTS

| | | | |
|---|---|---|---|
| 3,325,340 | 6/1987 | Walker et al. | 161/168 |
| 4,239,519 | 12/1980 | Beall et al. | 65/2 |
| 4,269,628 | 5/1981 | Ballard et al. | 106/86 |
| 4,454,237 | 6/1984 | Hoda et al. | 501/2 |
| 4,476,181 | 10/1984 | Briggs et al. | 428/450 |
| 4,485,203 | 11/1984 | Hutchinson | 524/414 |
| 4,539,046 | 9/1985 | McAloon et al. | 106/121 |
| 4,707,298 | 11/1987 | Tymon | 252/378 R |
| 4,772,577 | 9/1988 | Rittler | 252/378 R |
| 4,777,206 | 10/1988 | Rittler | 252/378 R |
| 4,812,260 | 3/1989 | Nelson | 501/148 |
| 4,818,435 | 4/1989 | Lukacs, III | 252/378 R |
| 4,877,484 | 10/1089 | Bohrn et al. | 162/103 |
| 4,877,551 | 10/1989 | Lukacs, III | 252/378 R |
| 4,885,330 | 12/1989 | Brungardt et al. | 524/447 |
| 4,888,233 | 12/1989 | Brew | 428/446 |
| 4,915,871 | 4/1990 | Atkinson et al. | 252/387 R |

*Primary Examiner*—A. A. Turner
*Attorney, Agent, or Firm*—Nicholas P. Triano, III; William L. Baker

[57] ABSTRACT

A method of rendering water resistant a vermiculite article such as a film or coating comprised of delaminated vermiculite lamellae is provided comprising the step of contacting the article with a solution of an inorganic monovalent cation selected from the group consisting of: $H^+$, $Na^+$, $K^+$, $Cs^+$, $Rb^+$ and $Fr^+$ and mixtures thereof.

The invention further relates to a water resistant article such as a film or coating comprised of delaminated vermiculite lamellae, which article is produced by contacting the article with a solution of an inorganic monovalent cation selected from the group consisting of: $H^+$, $Na^+$, $K^+$, $Cs^+$, $Rb^+$ and $Fr^+$.

21 Claims, No Drawings

WATER RESISTANT VERMICULITE ARTICLES AND METHOD OF THEIR MANUFACTURE

BACKGROUND OF THE INVENTION

This invention relates to water stable vermiculite articles and the method of their manufacture. More particularly, the invention relates to water resistant vermiculite films, coatings, composites and membranes.

Vermiculite articles such as films, coatings, membranes and the like may be prepared from vermiculite dispersions by a variety of methods. Vermiculite dispersions, and methods of their use as films, coatings, etc., are described for example in U.S. Pat. Nos. 4,655,842 and 4,780,147. Such vermiculite articles tend to be unstable when exposed to water, and most will rapidly deteriorate and even disintegrate when in contact with water.

This characteristic of these vermiculite articles is disadvantageous, and may render the article unusable in applications where the film or coating will be exposed to moisture, e.g. automotive gaskets, roofing and flooring tiles, textiles and construction products. For these and similar applications it has been desired to provide vermiculite articles which are water resistant, i.e. which are able to withstand immersion in water or prolonged exposure to moisture without significant deterioration.

It is known that water resistance may be imparted to vermiculite films by treatment with polyvalent cations. U.S. Pat. No. 3,325,340 for example discloses that the water resistance of vermiculite films may be improved by treating the films with strong electrolyte solutions (greater than 1M) containing polyvalent cations such as magnesium and aluminum. U.S. Pat. No. 4,219,609 teaches that vermiculite articles may be stabilized by exposing the article to a concentrated vapor of ammonia or an alkylamine.

However, both of the above mentioned treatments suffer disadvantages. The former requires the use of strong solutions, which are costly and may cause waste disposal problems, while the latter employs irritating and potentially toxic vapors.

Thus it is an object of the present invention to provide an alternative method of imparting water resistance to vermiculite articles, without the above mentioned disadvantages.

SUMMARY OF THE INVENTION

The present invention relates to a method of rendering water resistant a vermiculite article such as a film or coating comprised of delaminated vermiculite lamellae comprising the step of contacting the article with a solution of an inorganic monovalent cation selected from the group consisting of: $H^+$, $Na^+$, $K^+$, $Ca^+$, $Rb^+$ and $Fr^+$ and mixtures thereof. Vermiculite articles which may be rendered water proof by the method of the invention include but are not limited to films, coatings, composites such as vermiculite-containing paper, and membranes.

The invention further relates to a water resistant article such as a film or coating comprised of delaminated vermiculite lamellae, which article is produced by contacting the article with a solution of an inorganic monovalent cation selected from the group consisting of: $H^+$, $Na^+$, $K^+$, $Cs^+$, $Rb^+$ and $Fr^+$.

DETAILED DESCRIPTION OF THE INVENTION

The term vermiculite as used herein refers to the group of rock forming mineral species characterized by a layer latticed structure in which the silicate layer units have a thickness of approximately 10 Angstroms. The main elements present in the layer are magnesium, aluminum, iron, silica and oxygen with the layers being separated by 1 or 2 sheets of water molecules associated with cations such as magnesium, calcium, and sodium. The layers have considerable lateral extent relative to the thickness of the basic 10 Angstroms unit layer. The term vermiculite as used herein therefore includes minerals consisting wholly or largely of vermiculite, or minerals of a mixed-layer type containing vermiculite layers as an important constituent, such as hydrobiotites, and chlorite-vermiculite, but does not include minerals of the montomorillonite group.

Vermiculite dispersions, i.e. aqueous suspensions of vermiculite lamellae, may be prepared by various methods, generally involving treating crystals of vermiculite with a cation which promotes swelling of the crystals in a direction normal to the main cleavage plane of the crystals during immersion in water, immersing the treated crystals in water so that they swell, and shearing the swollen crystals in the water to form a dispersion of delaminated vermiculite lamellae. Thus, as used herein, the term delaminated vermiculite lamellae refers to such lamellae prepared according to the above-mentioned process.

A coating of these vermiculite lamellae may be prepared by applying the dispersion to a substrate and removing the aqueous carrier, e.g. by evaporation. Self supporting films may be prepared by applying the dispersion to a substrate, removing the aqueous carrier, and then separating the coating from the substrate.

One method of preparing vermiculite dispersions, and films and coatings therefrom, is described in the above mentioned U.S. Pat. Nos. 4,655,842 and 4,780,147, the disclosures of which are incorporated herein by reference. The method of the present invention may be advantageously employed to render such films and coatings water resistant or repellant. The present invention may also be used with vermiculite articles prepared from vermiculite dispersions made by other methods, such as that taught in U.S. Pat. No. 3,325,340.

Coatings of vermiculite lamellae may be applied to a wide variety of substrates. The substrate may be in any suitable form such as an individual fiber, a sheet, a woven or non-woven mat or a block. The substrate may be a combustible material, e.g., a cellulosic fiber material or a naturally occurring or synthetic organic polymer, or a non-combustible material such as glass, fiberglass, or metal. If the substrate is porous to the dispersion, as with most fiberglass mats, for example, the coating may derive from impregnation of the substrate.

According to the invention, the coating or film of vermiculite lamellae may be rendered water resistant or repellant by contacting the coating or film with a solution of an inorganic monovalent cation selected from the group consisting of $H^+$, $Na^+$, $K^+$, $Cs^+$, $Rb^+$ and $Fr^+$. Generally, $Na^+$ is preferred, as this cation is available inexpensively in a great variety of salt forms, and is non-toxic under normal conditions of use. However, in certain applications $Cs^+$, $H^+$, $Rb^+$ or $Fr^+$ might provide advantageous physical properties, and thus be preferred.

It is believed that these cationic solutions render the coating or film water resistant/repellant by exchanging the monovalent inorganic cation of the solution for the interlammelar cations initially associated with the vermiculite lamellae as a result of the preparative method. Typically, the vermiculite lamellae initially contain lithium or certain ammonium cations, and during treatment with a solution of the invention some or all of these cations are exchanged with the monovalent cation of said solution.

The vermiculite film or coating may be contacted with the solution in various ways. Preferably, the vermiculite article is immersed in the solution. The immersion time will vary depending upon the particular cation and the concentration of the solution. When a concentrated solution is used, less time is required to impart water resistance/repellancy, e.g. when a 1 Molar solution is used, the film may require as little as 10 minutes contact with the solution to develop adequate water resistance, whereas if a weak solution (e.g. 0.01M) is used, up to 24 hours immersion may be required. For a given concentration, the immersion time may be shortened by heating the solution, preferably to about 40° to 95° C. The solution may also be sprayed onto the vermiculite article, particularly when a strong solution is used and thus the required contact time is short.

As suggested above, a broad range of solution concentrations may advantageously be used in the invention. It is generally preferred to use a concentration of at least 0.0005M, and more preferably in the range of from about 0.01M to 1.5M. If rapid processing of the film is desired, it is preferred to use a solution having a relatively high concentration as discussed above, whereas if lower cost and easy disposal are needed a low concentration is preferred. The cationic solution of the invention is preferably an aqueous solution, for safety and low cost. However, if desired, the cation may be provided in an organic solvent, or a blend of solvent and water.

After treatment with a cationic solution of the invention, the vermiculite article is preferably subsequently removed from the solution and rinsed with water. If desired, the vermiculite article may then be allowed to dry at room temperature, or heat-dried. Different articles will require different drying times and conditions. A vermiculite film can typically be dried at 60° C. for approximately 30 minutes.

The water resistance of the thus-treated vermiculite article may be qualitatively determined by soaking the article in water for a predetermined period of time (18 hours in deionized water is used in the examples herein), and observing the degree of water resistance of the article according to the following grading system:

Grade A: structurally intact in room temperature water, commonly has a dark green appearance with no apparent bubbling of the film, no slightly swollen areas, no light gold areas; the film can be removed from the water and handled without tearing Grade B: structurally intact in room temperature water, may have bubbling, swollen areas, light gold areas, can be removed from water with tweezers without tearing although may tear during handling with fingers Grade C: structurally intact in room temperature water during slight agitation, may have bubbling, swollen areas, light gold areas, tears when removed from water with tweezers Grade D: partially dispersed in room temperature water, tears and disperses with slight agitation in water Grade F: totally dispersed in room temperature water after an overnight soak without any agitation or disperses within 10 minutes with slight agitation Grade F−: tears and/or disperses in water with slight agitation A quantitative measurement of the water resistance of a delaminated vermiculite film or coating may also be obtained by soaking the film or coating in water for a predetermined period of time and then testing the tensile strength of the article, with or without drying it first. Some erroneous results may be obtained using this test procedure, due to wrinkling and creasing of the vermiculite article during handling.

The following examples are illustrative of preferred embodiments of the invention and not of limiting effect. Other variations and modifications may be practiced by those skilled in the art without departing from the spirit and scope of the invention.

EXAMPLE 1

A vermiculite dispersion was prepared, using No. 5 grade vermiculite ore from Libby, Montana according to Example 2 of U.S. Pat. No. 4,655,842. The solids level of this dispersion was 7.5%.

A 30 mil vermiculite film was made from this dispersion, by wet drawing the film with a draw down gauge onto a granite surface. The film was allowed to dry overnight at ambient conditions, then removed from the granite and cut into 1"×5" strips. The length of the strips was parallel to the direction in which the film was drawn.

Four of the strips were placed in separate petri dishes and immersed in 100 ml of one molar solutions of $Na^+$, $K^+$, $Cs^+$, and $Rb^+$ respectively. After 18 hours the strips were removed from the solutions, rinsed 3 times with deionized water, and soaked in 100 ml of deionized water for 18 hours.

A fifth strip, the control, was immersed in deionized water, without prior immersion in a cationic solution of the invention.

The water resistance of the 5 strips, according to the criteria described hereinabove, was as follows:

| Strip No. | Exchange Cation | Water Resistance |
| --- | --- | --- |
| 1 | $Na^+$ | Grade A |
| 2 | $K^+$ | Grade A |
| 3 | $Cs^+$ | Grade A |
| 4 | $Rb^+$ | Grade A |
| 5 | None | Grade F |

Strip No. 5 redispersed after only 10 minutes immersion in deionized water, whereas the 4 strips which had been cation exchanged maintained structural integrity after 18 hours water immersion.

EXAMPLE 2

Example 1 was repeated, using No. 4 grade vermiculite ore from Enoree, South Carolina instead of the Libby vermiculite. The same results were obtained.

EXAMPLE 3

A vermiculite dispersion, and film samples of same, were prepared as described in Example 1. The film samples were immersed for 18 hours in exchange solutions of sodium salt dispersing agents, then rinsed and immersed 18 hours in deionized water, with results as shown in Table 1. The control was immersed only in deionized water.

TABLE 1

| Dispersing Agent | Concentration | Water Resistance |
|---|---|---|
| Sodium Hexametaphosphate | 5% | Grade A |
| Sodium Salt of Sulfonated Napthalene Formaldehyde | 5% | Grade A |
| Sodium Polyacrylate | 2% | Grade A |
| Sodium Maleate Diisobutylene | 5% | Grade A |
| Sodium Polymethacrylate | 5% | Grade A |
| Control | 0% | Grade F |

It was surprising to the inventors that Grade A water resistance was obtained after immersion in solutions of sodium salts which are well known as dispersing agents for clay minerals.

EXAMPLE 4

A 7.5% solids vermiculite dispersion was prepared according to Example 1. A 15 mil Manville Fiberglass Mat was dipped in the dispersion, the excess dispersion was scraped off and the mat was suspended from one end and allowed to dry overnight under ambient conditions. The mat was then die cut into 1"×5" strips.

Two of the coated strips were immersed in 1M solutions of sodium chloride and sodium acetate, rinsed and immersed in water, as described in Example 1. A third strip, the control, was immersed in water only. The water resistance was as follows:

| Strip No. | Exchange Solution | Water Resistance |
|---|---|---|
| 1 | sodium chloride | Grade A |
| 2 | sodium acetate | Grade A |
| 3 | none | Grade F |

When the glass mat strips 1 and 2 were rubbed after immersion in water no dispersion could be rubbed off, whereas much of the coating on mat strip 3 redispersed during immersion, and additional vermiculite could be removed by rubbing.

EXAMPLE 5

A vermiculite dispersion was prepared, using No. 4 grade vermiculite ore from Enoree, S.C., according to Example 2 of U.S. Pat. No. 4,655,842. The solids level of this dispersion was 7.5%.

A 30 mil vermiculite film was made from this dispersion, by wet drawing the film with a draw down gauge onto a granite surface. The film was allowed to dry overnight at ambient conditions, then removed from the granite and cut into 1"×5" strips. The length of the strips was parallel to the direction in which the film was drawn.

Four of the strips were placed in separate petri dishes and immersed in 100 ml of one molar solutions of hydrochloric acid (a), sulfuric acid (b), and acetic acid (c), a 0.02 molar solution of hydrochloric acid (d), and a 50% solution of citric acid (e). After 18 hours the strips were removed from the solutions, rinsed 3 times with deionized water, and soaked in 100 ml of deionized water for 18 hours.

A sixth strip, the control (f), was immersed in deionized water, without prior immersion in a cationic solution of the invention.

The water resistance of the 5 strips, according to the criteria described hereinabove, was as follows:

| Strip No. | Exchange Solution | Water Resistance |
|---|---|---|
| 1 | (a) | Grade A |
| 2 | (b) | Grade A |
| 3 | (c) | Grade A |
| 4 | (d) | Grade A |
| 5 | (e) | Grade A |
| 6 | (f) | Grade F |

The five strips which were cation exchanged with $H^+$ exhibited Grade A water resistance, while the control strip redispersed after only 10 minutes immersion in water.

What is claimed is:

1. A method of rendering water resistant a vermiculite article comprised of delaminated vermiculate lamellae, said article being prepared from an aqueous dispersion of said lamellae, said method comprising the step of contacting the article with a solution of an inorganic monovalent cation selected from the group consisting of: $H^+$, $Na^+$, $K^+$, $Cs^+$, $Rb^+$ and $Fr^+$, and mixtures thereof.

2. A method of claim 1 wherein the article is immersed in the solution.

3. A method of claim 2 further comprising the subsequent sequential steps of removing the article from the solution and drying the article.

4. A method of claim 2 wherein the article is immersed in the solution for at least ten minutes.

5. A method of claim 1 wherein the solution is sprayed onto the article.

6. A method of claim 1 wherein the concentration of the metal cation in the solution is less than 1.5M.

7. A method of claim 1 wherein the concentration of the metal cation in the solution is at least 0,005M.

8. A method of claim 1 wherein the vermiculite lamellae initially contain lithium cations and at least some of said lithium cations are exchanged with said monovalent cation.

9. A method of claim 1 wherein the inorganic monovalent cation is $Na^+$.

10. A method of claim 1 wherein the inorganic monovalent cation is $H^+$.

11. A water resistant vermiculite article comprised of delaminated vermiculite lamellae, said article being prepared from an aqueous dispersion of said lamellae and being rendered water resistant by contacting the article with a solution of an inorganic monovalent cation selected from the group consisting of: $H^+$, $Na^+$, $K^+$, $Cs^+$, $Rb^+$ and $Fr^+$ and mixtures thereof.

12. An article of claim 11 wherein the article is immersed in the solution.

13. An article of claim 12 wherein the article is immersed in the solution for at least ten minutes.

14. An article of claim 11 wherein the solution is sprayed onto the article.

15. An article of claim 11 wherein the concentration of the metal cations in the solution is less than 1.5M.

16. An article of claim 15 wherein the concentration of the metal cations in the solution is at least about 0,005M.

17. An article of claim 11 wherein the vermiculite lamellae initially contain lithium cations and at least some of said lithium cations are exchanged with said monovalent cation.

18. An article of claim 11 wherein the inorganic monovalent cation is $Na^+$.

19. An article of claim 11 wherein the inorganic monovalent cation is $H^+$.

20. A method of claim 1 wherein the solution is an aqueous solution.

21. An article of claim 11 wherein the solution is an aqueous solution.

* * * * *